(12) United States Patent
Kim et al.

(10) Patent No.: US 8,101,303 B2
(45) Date of Patent: Jan. 24, 2012

(54) LITHIUM BATTERY WITH LITHIUM SALT MIXTURE

(75) Inventors: Jeom-Soo Kim, Suwon-si (KR);
 Jin-Bum Kim, Suwon-si (KR);
 Yong-Chul Park, Suwon-si (KR);
 Duck-Chul Hwang, Suwon-si (KR);
 Jong-Hwa Lee, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1156 days.

(21) Appl. No.: 11/889,176

(22) Filed: Aug. 9, 2007

(65) Prior Publication Data

US 2008/0206650 A1  Aug. 28, 2008

(30) Foreign Application Priority Data

Feb. 26, 2007  (KR) .................. 10-2007-0019124

(51) Int. Cl.
 *H01M 6/16* (2006.01)
 *H01M 4/131* (2006.01)
 *H01M 4/525* (2010.01)
 *H01M 10/0568* (2010.01)
 *H01M 10/0569* (2010.01)

(52) U.S. Cl. ........ 429/322; 429/326; 429/330; 429/334; 429/231.95

(58) Field of Classification Search .................. None
See application file for complete search history.

(56) References Cited

U.S. PATENT DOCUMENTS

| 2003/0068562 A1 | 4/2003 | Kim et al. |
| 2006/0246356 A1 | 11/2006 | Abe et al. |

FOREIGN PATENT DOCUMENTS

| CN | 1336696 A | 2/2002 |
| CN | 1458704 A | 11/2003 |
| CN | 1698232 A | 11/2005 |
| EP | 1178555 | 2/2002 |
| EP | 1291941 | 3/2003 |
| EP | 1598895 | 11/2005 |
| EP | 1598895 A1 * | 11/2005 |
| EP | 1619741 | 1/2006 |
| EP | 2061115 A1 | 5/2009 |
| JP | 11-185807 | 7/1999 |
| JP | 2001-307774 | 11/2001 |
| JP | 2002-216753 | 8/2002 |

(Continued)

OTHER PUBLICATIONS

Yamamoto et al., 2002 Japanese Battery Conference Preview No. 3B05.

(Continued)

*Primary Examiner* — Keith Walker
(74) *Attorney, Agent, or Firm* — Robert E. Bushnell, Esq.

(57) ABSTRACT

A rechargeable lithium battery includes a positive electrode including a positive active material being capable of intercalating and deintercalating lithium ions; a negative electrode including a negative active material being capable of intercalating and deintercalating lithium ions; and an electrolyte including a non-aqueous organic solvent and a lithium salt. The positive electrode has a positive active mass density of 3.65 g/cc or more, and the lithium salt includes lithium hexafluorophosphate ($LiPF_6$), lithium tetrafluoroborate ($LiBF_4$), and a lithium imide-based compound. The rechargeable lithium battery has high capacity, excellent cycle-life, and reliability at a high temperature.

20 Claims, 1 Drawing Sheet

FOREIGN PATENT DOCUMENTS

| | | |
|---|---|---|
| JP | 2004-363086 | 12/2004 |
| JP | 2006-164742 | 6/2006 |
| JP | 2006-286603 | 10/2006 |
| KR | 10-0424646 | 3/2004 |

OTHER PUBLICATIONS

Japanese Office Action dated Sep. 7, 2010 for a corresponding Japanese patent application No. 2007-121919 and Request for Entry of the Accompanying Office Action herewith.

*Search Report* from the European Patent Office issued in Applicant's corresponding European Patent Application No. 07253996.8 dated Jun. 10, 2008.

European Office Action issued by European Patent Office on Jun. 15, 2011, corresponding to European Patent Application No. 07253996.8 attached herewith.

\* cited by examiner

LITHIUM BATTERY WITH LITHIUM SALT MIXTURE

CROSS-REFERENCE TO RELATED APPLICATION AND CLAIM OF PRIORITY

This application makes reference to, incorporates the same herein, and claims all benefits accruing under 35 U.S.C. §119 from an application for LITHIUM SECONDARY BATTERY earlier filed in the Korean Intellectual Property Office on 26 Feb. 2007 and there duly assigned Serial No. 10-2007-0019124.

BACKGROUND OF THE INVENTION (a) Field of the Invention

The present invention relates to a rechargeable lithium battery. More particularly, the present invention relates to a rechargeable lithium battery having high capacity, excellent cycle-life, and reliability at a high temperature.

(b) Description of the Related Art

Lithium rechargeable batteries have has recently drawn attention as power sources for small portable electronic devices. They use an organic electrolyte solution and thereby have twice the discharge voltage of a conventional battery using an alkali aqueous solution, and accordingly have high energy density.

For positive active materials of a rechargeable lithium battery, lithium-transition element composite oxides being capable of intercalating lithium such as $LiCoO_2$, $LiMn_2O_4$, $LiNiO_2$, $LiNi_{1-x}Co_xO_2$ (0<x<1), $LiMnO_2$, and so on have been researched.

As for negative active materials of a rechargeable lithium battery, various carbon-based materials such as artificial graphite, natural graphite, and hard carbon have been used, which can all intercalate and deintercalate lithium ions. Graphite of the carbon-based material increases discharge voltage and energy density for a battery because it has a low discharge potential of −0.2V, compared to lithium. A battery using graphite as a negative active material has a high average discharge potential of 3.6V and excellent energy density. Furthermore, graphite is most comprehensively used among the aforementioned carbon-based materials since graphite guarantees a better cycle life for a battery due to its outstanding reversibility. However, a graphite active material has low density and consequently low capacity in terms of energy density per unit volume when using the graphite as a negative active material. Further, it involves some dangers such as explosion or combustion when a battery is misused or overcharged and the like, because graphite is likely to react with an organic electrolyte at a high discharge voltage.

In order to solve those problems, a great deal of research on an oxide negative electrode has recently been performed. For example, amorphous tin oxide developed by Japan Fuji Film. Co., Ltd. has a high capacity per weight (800 mAh/g). However, it resulted in some critical defects such as a high initial irreversible capacity of up to 50%. Furthermore, a part of the tin oxide tended to be reduced into tin metal during the charge or discharge reaction, which exacerbates its acceptance for use in a battery.

Referring to another oxide negative electrode, a negative active material of $Li_aMg_bVO_c$ ($0.05 \leq 3$, $0.12 \leq b \leq 2$, $2 \leq 2c - a - 2b \leq 5$) is disclosed in Japanese Patent Publication No. 2002-216753. The characteristics of a lithium secondary battery including $Li_{1.1}V_{0.9}O_2$ were also presented in the 2002 Japanese Battery Conference (Preview No. 3B05).

However, such an oxide negative electrode does not show sufficient battery performance and therefore there has been much research into an oxide negative material.

SUMMARY OF THE INVENTION

One embodiment of the present invention provides a positive electrode for a rechargeable lithium battery that has high capacity, excellent cycle-life, and excellent reliability at a high temperature.

According to an embodiment of the present invention, provided is a rechargeable lithium battery that includes a positive electrode including a positive active material being capable of intercalating and deintercalating lithium ions; a negative electrode including a negative active material being capable of intercalating and deintercalating lithium ions; and an electrolyte including a non-aqueous organic solvent and a lithium salt.

The positive electrode has a positive active mass density of 3.65 g/cc or more, and the lithium salt includes lithium hexafluorophosphate ($LiPF_6$), lithium tetrafluoroborate ($LiBF_4$), and a lithium imide-based compound.

The lithium imide-based compound is selected from the group consisting of $Li[N(SO_2CF_3)_2]$, $Li[N(SO_2CF_2CF_3)_2]$, and a combination thereof.

The lithium imide-based compound is present at a 0.1 to 0.7M concentration in the electrolyte.

The $LiPF_6$ is present at a 0.7 to 1.5M concentration in the electrolyte.

The $LiBF_4$ is present in an amount of 0.05 to 0.5 wt % based on the total weight of the electrolyte.

The electrolyte further includes at least one lithium salt selected from the group consisting of $LiSbF_6$, $LiAsF_6$, $LiClO_4$, $LiCF_3SO_3$, $LiC_4F_9SO_3$, $LiAlO_4$, $LiAlCl_4$, $LiSO_3CF_3$, LiCl, LiI, $LiB(C_2O_4)_2$, and combinations thereof.

The positive active material may be a compound selected from the group consisting of the compounds represented by the following Formulas 1 to 24.

$$Li_aA_{1-b}B_bD_2 \quad \text{Formula 1}$$

wherein, in the above Formula 1, $0.95 \leq a \leq 1.1$ and $0 \leq b \leq 0.5$.

$$Li_aE_{1-b}B_bO_{2-c}L_c \quad \text{Formula 2}$$

wherein, in the above Formula 2, $0.95 \leq a \leq 1.1$, $0 \leq b \leq 0.5$, and $0 \leq c \leq 0.05$.

$$LiE_{2-b}B_bO_{4-c}L_c \quad \text{Formula 3}$$

wherein, in the above Formula 3, $0 \leq b \leq 0.5$ and $0 \leq c \leq 0.05$.

$$Li_aNi_{1-b-c}Co_bB_cD_\alpha \quad \text{Formula 4}$$

wherein, in the above Formula 4, $0.95 \leq a \leq 1.1$, $0 \leq b \leq 0.5$, $0 \leq c \leq 0.05$, and $0 < \alpha \leq 2$.

$$Li_aNi_{1-b-c}Co_bB_cO_{2-\alpha}L_\alpha \quad \text{Formula 5}$$

wherein, in the above Formula 5, $0.95 \leq a \leq 1.1$, $0b \leq 0.5$, $0 \leq c \leq 0.05$, and $0 < \alpha < 2$.

$$Li_aNi_{1-b-c}Co_bB_cO_{2-\alpha}L_2 \quad \text{Formula 6}$$

wherein, in the above Formula 6, $0.95 \leq a \leq 1.1$, $0 \leq b \leq 0.5$, $0 \leq c \leq 0.05$, and $0 < \alpha < 2$.

$$Li_aNi_{1-b-c}Mn_bB_cD_\alpha \quad \text{Formula 7}$$

wherein, in the above Formula 7, $0.95 \leq a \leq 1.1$, $0 \leq b \leq 0.5$, $0 \leq c \leq 0.05$, and $0 < \alpha \leq 2$.

$Li_aNi_{1-b-c}Mn_bB_cO_{2-\alpha}L_\alpha$     Formula 8 wherein, in the above Formula 8, $0.95 \leq a \leq 1.1$, $0 \leq b \leq 0.5$, $0 \leq c \leq 0.05$, and $0 < \alpha < 2$.

$Li_aNi_{1-b-c}Mn_bB_cO_{2-\alpha}L_2$     Formula 9 wherein, in the above Formula 9, $0.95 \leq a \leq 1.1$, $0 \leq b \leq 0.5$, $0 \leq c \leq 0.05$, and $0 < \alpha < 2$.

$Li_aNi_bE_cG_dO_2$     Formula 10 wherein, in the above Formula 10, $0.90 \leq a \leq 1.1$, $0 \leq b \leq 0.9$, $0 \leq c \leq 0.9$, and $0.001 \leq d \leq 0.2$.

$Li_aNi_bCo_cMn_dG_eO_2$     Formula 11 wherein, in the above Formula 11, $0.90 \leq a \leq 1.1$, $0 \leq b \leq 0.9$, $0 \leq c \leq 0.5$, $0 \leq d \leq 0.5$, and $0.001 \leq e \leq 0.2$.

$Li_aNiG_bO_2$     Formula 12 wherein, in the above Formula 12, $0.90 \leq a \leq 1.1$ and $0.001 \leq b \leq 0.1$.

$Li_aCoG_bO_2$     Formula 13 wherein, in the above Formula 13, $0.90 \leq a \leq 1.1$ and $0.001 \leq b \leq 0.1$.

$Li_aMnG_bO_2$     Formula 14 wherein, in the above Formula 14, $0.90 \leq a \leq 1.1$ and $0.001 \leq b \leq 0.1$.

$Li_aMn_2G_bO_4$     Formula 15 wherein, in the above Formula 15, $0.90 \leq a \leq 1.1$ and $0.001 \leq b \leq 0.2$.

$QO_2$.     Formula 16

$QS_2$.     Formula 17

$LiQS_2$.     Formula 18

$V_2O_5$.     Formula 19

$LiV_2O_5$.     Formula 20

$LiZO_2$.     Formula 21

$LiNiVO_4$.     Formula 22

$Li_{3-f}J_2(PO_4)_3$ $(0 \leq f \leq 3)$.     Formula 23

$Li_{3-f}Fe_2(PO_4)_3$ $(0 \leq f \leq 2)$.     Formula 24

In the above Formulas 1 to 24, A is selected from the group consisting of Ni, Co, Mn, and combinations thereof; T is selected from the group consisting of Al, Ni, Co, Mn, Cr, Fe, Mg, Sr, V, a rare earth element, and combinations thereof; D is selected from the group consisting of O, F, S, P, and combinations thereof; E is selected from the group consisting of Co, Mn, and combinations thereof; L is selected from the group consisting of F, S, P, and combinations thereof; G is selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Tl, Si, Ge, Sn, P, As, Sb, Bi, S, Se, Te, Po, Fe, Sr, lanthanide, and combinations thereof; Q is selected from the group consisting of Ti, Mo, Mn, and combinations thereof; Z is selected from the group consisting of Cr, V, Fe, Sc, Y, Ti, and combinations thereof; and J is selected from the group consisting of V, Cr, Mn, Co, Ni, Cu, and combinations thereof.

The positive active material is a material that is surface-treated with the compound of the following Formula 25:

$MXO_k$     Formula 25 wherein, in the above Formula 25, M is at least one selected from the group consisting of an alkali metal, an alkaline-earth metal, a Group 13 element, a Group 14 element, a transition element, and a rare earth element, X is an element being capable of forming a double bond with oxygen, and k ranges from 2 to 4.

The element M is selected from the group consisting of Na, K, Mg, Ca, Sr, Ni, Co, Si, Ti, B, Al, Sn, Mn, Cr, Fe, V, Zr, and combinations thereof.

X is selected from the group consisting of P, S, W, and combinations thereof.

The negative active material may include at least one selected from the group consisting of lithium, a metal being capable of alloying with lithium, a carbonaceous material, a composite material including the metal and carbonaceous material, and combinations thereof.

The metal being capable of alloying with lithium may include at least one selected from the group consisting of Al, Si, Sn, Pb, Zn, Bi, In, Mg, Ga, Cd, Ag, Ge, Ti, and combinations thereof.

The non-aqueous organic solvent may include a carbonate-based, ester-based, ether-based, ketone-based, alcohol-based, or aprotic solvent.

According to another aspect of the present invention, a rechargeable lithium battery includes: a positive electrode including a positive active material being capable of intercalating and deintercalating lithium ions; a negative electrode including a negative active material being capable of intercalating and deintercalating lithium ions; and an electrolyte including a non-aqueous organic solvent and a lithium salt, the lithium salt including lithium hexafluorophosphate ($LiPF_6$), lithium tetrafluoroborate ($LiBF_4$), and a lithium imide-based compound.

According to still another aspect of the present invention, a rechargeable lithium battery includes: a positive electrode including a positive active material being capable of intercalating and deintercalating lithium ions, the positive electrode including a lithiated intercalation compound, a surface-treatment layer on the lithiated intercalation compound, the surface-treatment layer including a compound of Formula 25 and a solid-solution compound between the lithiated intercalation compound and the compound of Formula 25, the solid-solution compound including Li, M', M, and X:

$MXO_k$     (25)

wherein M is at least one selected from the group consisting of an alkali metal, an alkaline-earth metal, a Group 13 element, a Group 14 element, a transition element, and a rare earth element, X is an element being capable of forming a double bond with oxygen, and k ranges from 2 to 4; and M' is at least one selected from the group consisting of Al, Ni, Co, Mn, Cr, Fe, Mg, Sr, V, a rare-earth element and a combination thereof; a negative electrode including a negative active material being capable of intercalating and deintercalating lithium ions; and an electrolyte including a non-aqueous organic solvent and a lithium salt, the lithium salt including lithium hexafluorophosphate ($LiPF_6$), lithium tetrafluoroborate ($LiBF_4$), and a lithium imide-based compound, the concentration of the $LiPF_6$ in the electrolyte ranging from 0.7 to 1.5M, the concentration of the $LiBF_4$ in the electrolyte ranging from 0.05 to 0.5 wt % based on the total weight of the electrolyte, the concentration of the lithium imide-based compound in the electrolyte ranging from 0.1 to 0.7M.

BRIEF DESCRIPTION OF THE DRAWING

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION

Figure 1:
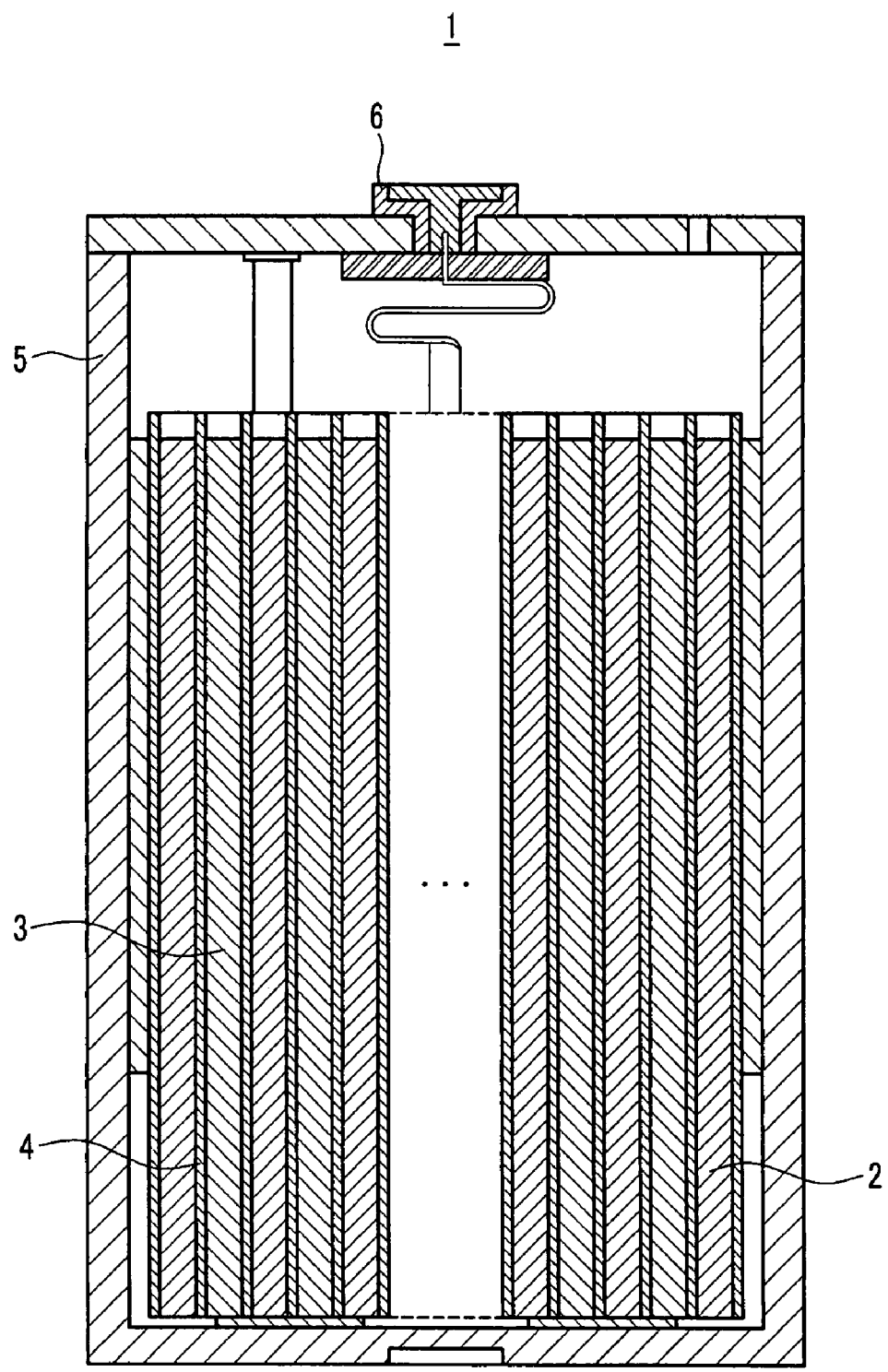
FIG. 1 is a schematic cross-sectional view of a rechargeable lithium battery according to one embodiment of the present invention.

When a lithium battery is charged at a temperature of more than 25° C., positive and negative electrodes are thermally instable so that an electrolyte salt, an organic solvent, and active materials of the positive and negative electrodes may decompose and thereby cell cycle-life and safety may be deteriorated.

In order to solve the above problems, an optimal combinatorial lithium salt is used to provide a rechargeable lithium battery having excellent cycle-life characteristics and safety even when using a positive electrode with a high active mass density.

FIG. 1 is a schematic cross-sectional view of a rechargeable lithium battery according to one embodiment of the present invention.

The rechargeable lithium battery 1 is generally constructed of a negative electrode 2, a positive electrode 3, a separator interposed between the positive electrode 3 and the negative electrode 2, and an electrolyte in which the separator 4 is immersed, and in addition, a cell case 5 and a sealing member 6 sealing the cell case 5.

The positive electrode 2 includes a current collector and the positive active material layer disposed on the current collector. The positive active material layer includes a positive active material being capable of performing an electrochemical redox reaction.

The positive active material includes a lithiated intercalation compound that is capable of reversibly intercalating and deintercalating lithium. Specific examples of the lithiated intercalation compound may be a composite oxide including lithium and a metal selected from the group consisting of cobalt, manganese, nickel, and combinations thereof. The lithiated intercalation compound may be a compound selected from the group consisting of the compounds represented by the following Formulas 1 to 24.

$$Li_aA_{1-b}T_bD_2 \qquad \text{Formula 1}$$

wherein, in the above Formula 1, $0.95 \leq a \leq 1.1$ and $0 \leq b \leq 0.5$.

$$Li_aE_{1-b}T_bO_{2-c}L_c \qquad \text{Formula 2}$$

wherein, in the above Formula 2, $0.95 \leq a \leq 1.1$, $0 \leq b \leq 0.5$, and $0 \leq c \leq 0.05$.

$$LiE_{2-b}T_bO_{4-c}L_c \qquad \text{Formula 3}$$

wherein, in the above Formula 3, $0 \leq b \leq 0.5$ and $0 \leq c \leq 0.05$.

$$Li_aNi_{1-b-c}Co_bT_cD_\alpha \qquad \text{Formula 4}$$

wherein, in the above Formula 4, $0.95 \leq a \leq 1.1$, $0 \leq b \leq 0.5$, and $0 \leq c \leq 0.05$, $0 < \alpha \leq 2$.

$$Li_aNi_{1-b-c}Co_bT_cO_{2-\alpha}L_\alpha \qquad \text{Formula 5}$$

wherein, in the above Formula 5, $0.95 \leq a \leq 1.1$, $0 \leq b \leq 0.5$, and $0 \leq c \leq 0.05$, $0 < \alpha < 2$.

$$Li_aNi_{1-b-c}Co_bT_cO_{2-\alpha}L_2 \qquad \text{Formula 6}$$

wherein, in the above Formula 6, $0.95 \leq a \leq 1.1$, $0 \leq b \leq 0.5$, and $0 \leq c \leq 0.05$, $0 < \alpha < 2$.

$$Li_aNi_{1-b-c}Mn_bT_cD_\alpha \qquad \text{Formula 7}$$

wherein, in the above Formula 7, $0.95 \leq a \leq 1.1$, $0 \leq b \leq 0.5$, $0 \leq c \leq 0.05$, and $0 < \alpha \leq 2$.

$$Li_aNi_{1-b-c}Mn_bT_cO_{2-\alpha}L_\alpha \qquad \text{Formula 8}$$

wherein, in the above Formula 8, $0.95 \leq a \leq 1.1$, $0 \leq b \leq 0.5$, $0 \leq c \leq 0.05$, and $0 < \alpha < 2$.

$$Li_aNi_{1-b-c}Mn_bT_cO_{2-\alpha}L_2 \qquad \text{Formula 9}$$

wherein, in the above Formula 9, $0.95 \leq a \leq 1.1$, $0 \leq b \leq 0.5$, $0 \leq c \leq 0.05$, and $0 < \alpha < 2$.

$$Li_aNi_bE_cG_dO_2 \qquad \text{Formula 10}$$

wherein, in the above Formula 10, $0.90 \leq a \leq 1.1$, $0 \leq b \leq 0.9$, $0 \leq c \leq 0.9$, and $0.001 \leq d \leq 0.2$.

$$Li_aNi_bCo_cMn_dG_eO_2 \qquad \text{Formula 11}$$

wherein, in the above Formula 11, $0.90 \leq a \leq 1.1$, $0 \leq b \leq 0.9$, $0 \leq c \leq 0.5$, $0 \leq d \leq 0.5$, and $0.001 \leq e \leq 0.2$.

$$Li_aNiG_bO_2 \qquad \text{Formula 12}$$

wherein, in the above Formula 12, $0.90 \leq a \leq 1.1$ and $0.001 \leq b \leq 0.1$.

$$Li_aCoG_bO_2 \qquad \text{Formula 13}$$

wherein, in the above Formula 13, $0.90 \leq a \leq 1.1$ and $0.001 \leq b \leq 0.1$.

$$Li_aMnG_bO_2 \qquad \text{Formula 14}$$

wherein, in the above Formula 14, $0.90 \leq a \leq 1.1$ and $0.001 \leq b \leq 0.1$.

$$Li_aMn_2G_bO_4 \qquad \text{Formula 15}$$

wherein, in the above Formula 15, $0.90 \leq a \leq 1.1$ and $0.001 \leq b \leq 0.2$.

$$QO_2. \qquad \text{Formula 16}$$

$$QS_2. \qquad \text{Formula 17}$$

$$LiQS_2. \qquad \text{Formula 18}$$

$$V_2O_5. \qquad \text{Formula 19}$$

$$LiV_2O_5. \qquad \text{Formula 20}$$

$$LiZO_2. \qquad \text{Formula 21}$$

$$LiNiVO_4. \qquad \text{Formula 22}$$

$$Li_{3-f}J_2(PO_4)_3 \, (0 \leq f \leq 3). \qquad \text{Formula 23}$$

$$Li_{3-f}Fe_2(PO_4)_3 \, (0 \leq f \leq 2). \qquad \text{Formula 24}$$

In the above Formulas 1 to 24, A is selected from the group consisting of Ni, Co, Mn, and combinations thereof; T is selected from the group consisting of Al, Ni, Co, Mn, Cr, Fe, Mg, Sr, V, a rare earth element, and combinations thereof; D is selected from the group consisting of O, F, S, P, and combinations thereof; E is selected from the group consisting of Co, Mn, and combinations thereof; F is selected from the group consisting of F, S, P, and combinations thereof; G is selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Tl, Si, Ge, Sn, P, As, Sb, Bi, S, Se, Te, Po, Fe, Sr, lanthanide, and combinations thereof; Q is selected from the group consisting of Ti, Mo, Mn, and combinations thereof; Z is selected from the group consisting of Cr, V, Fe, Sc, Y, Ti, and combinations thereof; and J is selected from the group consisting of V, Cr, Mn, Co, Ni, Cu, and combinations thereof.

The positive active material may be elemental sulfur ($S_8$), and/or a sulfur-based compound such as $Li_2S_n(n\geq 1)$, $Li_2S_n$ ($n\geq 1$) dissolved in a catholyte, an organic sulfur compound, or a carbon-sulfur polymer (($C_2S_f)_n$: $f=2.5$ to 50, $n\geq 2$).

The positive active material may be surface-treated with the compound of the following Formula 25:

MXO$_k$           Formula 25 wherein, in the above Formula 25, M is at least one selected from the group consisting of an alkali metal, an alkaline-earth metal, a Group 13 element, a Group 14 element, a transition element, and a rare earth element, X is an element being capable of forming a double bond with oxygen, and k ranges from 2 to 4.

The Groups 13 and 14 respectively refer to an Al-containing group and a Si-containing group according to a new IUPAC system in the periodic table. According to one embodiment, M is Na, K, Mg, Ca, Sr, Ni, Co, Si, Ti, B, Al, Sn, Mn, Cr, Fe, V, Zr, or combinations thereof, and X is P, S, W, or combinations thereof.

The element M of the compound of the above Formula 25 is present in an amount of 0.1 to 15 wt % based on the total weight of the positive active material. According to one embodiment, the element M is present in an amount of 0.1 to 6 wt % based on the total weight of the positive active material. The element X that is capable of forming a double bond with oxygen is present in an amount of 0.1 to 15 wt % based on the total weight of the positive active material. According to one embodiment, the element X is present in an amount of 0.1 to 6 wt % based on the total weight of the positive active material. When the elements M and X that are present on the surface of the active material are out of the ranges, electrochemical characteristics at high rate and thermal stability of the active material are not improved.

In the case that the active material to be surface treated is a lithiated intercalation compound, a solid-solution compound is formed from the lithiated intercalation compound and the MXO$_k$ compound on the surface of the active material in addition to the MXO$_k$ compound of Formula 25. In this case, a surface-treatment layer of the active material includes both the solid-solution compound and the MXO$_k$ compound. The solid-solution compound includes Li, M' where M' is at least one selected from the group consisting of Al, Ni, Co, Mn, Cr, Fe, Mg, Sr, V, a rare-earth element and a combination thereof, that originates from the lithiated intercalation compound, M where M is at least one selected from the group consisting of an alkali metal, an alkaline earth metal, a Group 13 element, a Group 14 element, a transition metal, a rare-earth element, and combinations thereof, X which is an element capable of forming a double bond with oxygen, and O (oxygen).

When the surface-treatment layer including the solid-solution compound and the MXO$_k$ compound on the surface of these intercalation compounds is formed, the elements M and X have a concentration gradient from the surface of the active material toward the center of the active material particle grain. That is, M and X have a high concentration at the surface of the active material and the concentration gradually decreases as it goes toward the inside of the particle.

The surface-treatment layer including the MXO$_k$ compound is formed according to the method disclosed in Korean Patent No. 424646, which is incorporated herein by reference.

The active material that is surface-treated with MXO$_k$ (k ranges from 2 to 4) shows excellent structural stability and high average discharge voltages both at high and low rates, and an excellent cycle-life and capacity, due to its structural stability. Its excellent thermal stability improves the safety of the cells in various categories indicating combustion, heat exposure, and overcharge tests.

According to one embodiment of the present invention, the positive active material including a compound of the above Formulas 1 to 15 that is surface-treated with the compound of the above Formula 25 may be appropriate.

The positive active material layer may further include a binder for improving adherence between the positive active material layer and a current collector, or a conductive agent for improving electrical conductivity.

The binder may be selected from the group consisting of polyvinylchloride, polyvinyldifluoride, an ethylene oxide-containing polymer, polyvinylalcohol, carboxylated polyvinylchloride, polyvinylidenefluoride, polyimide, polyurethane, an epoxy resin, nylon, carboxymethyl cellulose, hydroxypropylene cellulose, diacetylene cellulose, polyvinyl pyrrolidone, polytetrafluoroethylene, styrene-butadiene rubber, acrylated styrene-butadiene rubber, copolymers thereof, and combinations thereof.

Any electrically conductive material can be used as a conductive agent unless it causes any chemical change. Examples of the conductive agent include natural graphite, artificial graphite, carbon black, acetylene black, ketjen black, carbon fiber, a metal powder or a metal fiber including copper, nickel, aluminum, silver, and so on, or a polyphenylene derivative.

The positive electrode 2 can be fabricated as follows. A positive active material composition is prepared by mixing a positive active material, a binder, and optionally a conductive agent in a solvent, and then the composition is applied on a positive current collector followed by drying and compression. The positive electrode manufacturing method is well known, and thus it is not described in detail in the present specification.

The positive active material, the binder, and the conductive agent are the same as above-described.

The solvent used in preparing the positive active material composition can be N-methylpyrrolidone, but it is not limited thereto.

The current collector may be selected from the group consisting of an aluminum foil, a nickel foil, a stainless steel foil, a titanium foil, a nickel foam, a copper foam, a polymer substrate coated with a conductive metal, and combinations thereof. According to one embodiment, an aluminum foil may be appropriate.

In addition, the active mass density of the positive electrode 2 may be adjusted in the fabrication of the positive electrode 2 by controlling the pressure, and the frequency and temperature of compression.

The compression pressure, compression frequency number, and the compression temperature are not specifically limited. They may be adjusted such that the fabricated positive electrode may have an active mass density of 3.65 g/cc or more, and more specifically from 3.7 to 4.1 g/cc. The active mass density of the positive electrode obtained after a charged and discharged rechargeable lithium battery is disassembled decreases relative to that before charge and discharge. According to one embodiment, the positive electrode has an active mass density of 3.6 to 3.9 g/cc after charge and discharge.

The active mass density of an electrode is a value obtained by dividing the mass of the components (active material, conductive agent, and binder) excluding a current collector in the electrode by the volume. The unit of the active mass density is g/cc. Generally, the higher the active mass density of an electrode becomes, the better the battery capacity becomes. However, there is problem in that the cycle-life characteristic deteriorates as the active mass density becomes high. For this reason, the active mass density of a positive electrode used in a generally-used rechargeable lithium battery is about 3.6 g/cc. On the contrary, the rechargeable lithium battery suggested in the embodiment of the present invention includes a positive electrode of a high active mass density and can implement excellent capacity characteristics without deterioration of cycle-life by optimally including combinatorial lithium salts. When the active mass density of the positive electrode is less than 3.65 g/cc, the capacity is not significantly increased within a limited volume.

The negative electrode 3 includes a current collector and a negative active material layer disposed on the current collector. The negative active material layer includes electrochemically redox materials that can reversibly intercalate and deintercalate lithium ions.

The negative active material may include at least one selected from the group consisting of lithium, a metal being capable of alloying with lithium, a carbonaceous material, a composite material including the metal and carbonaceous material, and combinations thereof. The metal being capable of alloying with lithium may include Al, Si, Sn, Pb, Zn, Bi, In, Mg, Ga, Cd, Ag, Ge, or Ti. The carbonaceous material may include artificial graphite, natural graphite, graphitized carbon fiber, graphitized mesocarbon microbeads, fullerene, amorphous carbon, and so on. The amorphous carbon may be a soft carbon (carbon obtained by firing at a low temperature) or a hard carbon (carbon obtained by firing at a high temperature), and the crystalline carbon may be sheet-shaped, spherical-shaped, or fiber-shaped natural graphite or artificial graphite.

The active material layer of the negative electrode 3 may further include a binder for improving adherence between the negative active material layer and a current collector, and/or a conductive agent for improving electrical conductivity as in the positive electrode 2.

The binder and the conductive agent are the same as described above.

The negative electrode 3 can be fabricated as follows: a negative active material composition is prepared by mixing a negative active material, a binder, and optionally a conductive agent in a solvent, and then the composition is applied on a negative current collector such as copper. The negative electrode manufacturing method is well known, and thus it is not described in detail in the present specification.

The solvent used in preparing the negative active material composition can be N-methylpyrrolidone, but it is not limited thereto.

The current collector may be selected from the group consisting of a copper foil, a nickel foil, a stainless steel foil, a titanium foil, a nickel foam, a copper foam, a polymer substrate coated with a conductive metal, and combinations thereof. According to one embodiment, a copper foil or a nickel foil may be appropriate.

In the rechargeable battery according to one embodiment of the present invention, the electrolyte includes a non-aqueous organic solvent and a lithium salt.

The lithium salts act as a lithium-ion source, helping basic battery operation. According to one embodiment of the present invention, the lithium salt includes lithium hexafluorophosphate ($LiPF_6$), lithium tetrafluoroborate ($LiBF_4$), and a lithium imide-based compound.

The $LiPF_6$ provides excellent ion conductivity and is present at a 0.7 to 1.5M concentration in the electrolyte. According to one embodiment, the $LiPF_6$ is present at a 0.8 to 1.2M concentration. When the concentration of $LiPF_6$ is less than 0.7M, electrolyte ion conductivity decreases, whereas when it is more than 1.5M, excessive salts may be present in the electrolyte.

The $LiBF_4$ provides stability at a high temperature. The $LiBF_4$ is present in an amount of 0.05 to 0.5 wt % based on the total weight of the electrolyte. According to one embodiment, the $LiBF_4$ is present in an amount of 0.1 to 0.3 wt % based on the total weight of the electrolyte. When the amount of $LiBF_4$ is less than 0.05 wt %, the $LiBF_4$ use effect is not sufficient, whereas when it is more than 0.5 wt %, battery performance may deteriorate.

The lithium imide-based compound also endows stability at a high temperature. Examples of the lithium imide-based compound include at least one lithium salt selected from the group consisting of $Li[N(SO_2CF_3)_2]$, $Li[N(SO_2CF_2CF_3)_2]$, and combinations thereof.

The lithium imide-based compound is present at a 0.1 to 0.7M concentration in the electrolyte. According to one embodiment, the lithium imide-based compound is present at a 0.3 to 0.6M concentration. When the concentration of the lithium imide-based compound is less than 0.1M, high temperature characteristics are not improved, whereas when it is more than 0.7M, battery performance may deteriorate because of an excessive amount of the lithium imide based compound.

The above $LiPF_6$, the $LiBF_4$, and the lithium imide-based compound are lithium salts acting as a lithium ion source in a conventional electrolyte of a rechargeable lithium battery. The $LiPF_6$ has good ion conductivity, but has low high temperature stability, whereas $LiBF_4$ has somewhat reduced ion conductivity but relatively better high temperature stability than $LiPF_6$. The lithium imide-based compound has excellent high temperature stability. According to one embodiment of the present invention, the three component salts are mixed with a specific combination as a lithium salt, and thereby cycle-life characteristics at normal and high temperatures may be improved, even when using a positive electrode having a high active mass density.

According to one embodiment of the present invention, the electrolyte may further include a conventional lithium salt as a lithium ion source. Examples of the conventional lithium salt may include at least one selected from the group consisting of $LiSbF_6$, $LiAsF_6$, $LiClO_4$, $LiCF_3SO_3$, $LiC_4F_9SO_3$, $LiAlO_4$, $LiAlCl_4$, $LiSO_3CF_3$, LiCl, LiI, $LiB(C_2O_4)_2$, and combinations thereof.

The lithium salt may be used at a 0.6 to 2.0M concentration. According to one embodiment, the lithium salt may be used at a 0.7 to 1.6 M concentration. When the lithium salt concentration is less than 0.6M, electrolyte performance may be deteriorated due to low electrolyte conductivity, whereas when it is more than 2.0M, lithium ion mobility may be reduced due to an increase of electrolyte viscosity.

The non-aqueous organic solvent acts as a medium for transmitting ions taking part in the electrochemical reaction of the battery.

The non-aqueous organic solvent may include a carbonate-based, ester-based, ether-based, ketone-based, alcohol-based, or aprotic solvent.

Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and so on. Examples of the ester-based solvent may include n-methyl acetate, n-ethyl acetate, n-propyl acetate, dimethylacetate, methylpropionate, ethylpropionate, γ-butyrolactone, decanolide, valerolactone, mevalonolactone, caprolactone, and so on. Examples of the ether-based solvent include dibutyl ether, tetraglyme, diglyme, dimethoxyethane, 2-methyltetrahydrofuran, tetrahydrofuran, and so on. Examples of the ketone-based solvent include cyclohexanone and so on. Examples of the alcohol-based solvent include ethanol, isopropyl alcohol, and so on. Examples of the aprotic solvent include a nitrile such as X—CN (wherein R is a C2 to C20 linear, branched, or cyclic hydrocarbon, a double bond, an aromatic ring, or an ether bond), an amide such as dimethylformamide, a dioxolane such as 1,3-dioxolane, sulfolane, and so on.

The non-aqueous organic solvent may be used singularly or as a mixture. When the organic solvent is used as a mixture, the mixture ratio can be controlled in accordance with a desirable battery performance.

The carbonate-based solvent may include a mixture of a cyclic carbonate and a linear carbonate. When the cyclic carbonate and the chain carbonate are mixed together in a volume ratio of 1:1 to 1:9, and the mixture is used as an electrolyte, the electrolyte performance may be enhanced.

The electrolyte according to one embodiment of the present invention may include mixtures of carbonate-based solvents and aromatic hydrocarbon-based solvents. The carbonate-based solvents and the aromatic hydrocarbon-based solvents are preferably mixed together in the volume ratio of 1:1 to 30:1.

The aromatic hydrocarbon-based organic solvent may be represented by the following Formula 26:

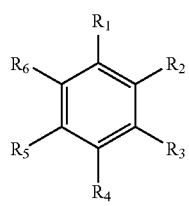

Formula 26 where $R_1$ to $R_6$ are independently selected from the group consisting of hydrogen, a halogen, a C1 to C10 alkyl, a haloalkyl, and combinations thereof.

The aromatic hydrocarbon-based organic solvent may include, but is not limited to, at least one selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and combinations thereof.

The electrolyte may further include an additive to improve cell characteristics. Specific examples of the additive include an ethylene carbonate-based compound represented by the following Formula 27 to improve thermal stability of a rechargeable lithium battery:

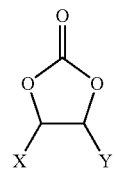

Formula 27 wherein, in the above Formula 27, X and Y are independently selected from the group consisting of hydrogen, a halogen, cyano (CN), nitro ($NO_2$), and a fluorinated C1 to C5 alkyl, provided that at least one of X and Y is selected from the group consisting of a halogen, a cyano (CN), a nitro ($NO_2$), and a fluorinated C1 to C5 alkyl.

According to one embodiment, the ethylene carbonate-based compound may be selected from the group consisting of ethylene carbonate, fluoroethylene carbonate, difluoroethylene carbonate, chloroethylene carbonate, dichloroethylene carbonate, bromoethylene carbonate, dibromoethylene carbonate, nitroethylene carbonate, cyanoethylene carbonate, and combinations thereof. According to another embodiment, fluoroethylene carbonate may be appropriate.

The ethylene carbonate-based additive is not limited to a specific amount, and may be added in an appropriate amount to obtain thermal stability.

The rechargeable lithium battery generally includes a separator between the positive electrode and the negative electrode. The separator may include polyethylene, polypropylene, or polyvinylidene fluoride, or a multilayer thereof such as a polyethylene/polypropylene bilayered separator, a polyethylene/polypropylene/polyethylene three-layered separator, or a polypropylene/polyethylene/polypropylene three-layered separator.

The following examples illustrate the present invention in more detail. These examples, however, should not in any sense be interpreted as limiting the scope of the present invention.

Example 1-15 and Comparative Example 1-23

Fabricating a Rechargeable Lithium Battery

A lithium salt described in the following Table 1 was added to a non-aqueous organic solvent including ethylene carbonate/dimethyl carbonate/ethylmethyl carbonate (EC/DMC/EMC) in a volume ratio of 3/3/4 to prepare an electrolyte.

$LiCoO_2$ with an average particle diameter of 10 μm as a positive active material, polyvinylidene fluoride (PVDF) as a binder, and carbon (Super-P) as a conductive agent were mixed with a weight ratio of 94/3/3, and dispersed in N-methyl-2-pyrrolidone to prepare a positive active material composition. The composition was coated on an aluminum foil with a thickness of 15 μm, dried, and compressed, and thereby a positive electrode was fabricated. Positive electrodes having various active mass densities as shown in the following Table 1 were fabricated by controlling the compression pressure, compression frequency number, and compression temperature.

A carbon negative active material and a PVDF binder were mixed in a weight ratio of 94:6, and dispersed in N-methyl-2-pyrrolidone, respectively, to prepare a negative electrode slurry. The slurry was coated on a copper foil with a thickness of 10 μm, dried, and compressed, and thereby a negative electrode was fabricated.

A polyethylene separator was interposed between the fabricated electrodes, spirally wound, compressed, and then an electrolyte was injected to fabricate a 18650 cylindrical battery.

In the following Table 1, LiTFSI denotes lithium bis(trimethanesulfonyl)imide ($Li[N(SO_2CF_3)_2]$), and LiBETI denotes lithium bis(perfluoroethylsulfonyl) imide ($Li[N(SO_2CF_2CF_3)_2]$).

TABLE 1

| | Positive active mass density (g/cc) | Lithium salt |
|---|---|---|
| Comp. Ex. 1 | 3.60 | 1.3M $LiPF_6$ |
| Comp. Ex. 2 | 3.65 | 1.3M $LiPF_6$ |
| Comp. Ex. 3 | 3.70 | 1.3M $LiPF_6$ |
| Comp. Ex. 4 | 3.75 | 1.3M $LiPF_6$ |
| Comp. Ex. 5 | 3.80 | 1.3M $LiPF_6$ |
| Comp. Ex. 6 | 3.85 | 1.3M $LiPF_6$ |
| Comp. Ex. 7 | 3.90 | 1.3M $LiPF_6$ |
| Comp. Ex. 8 | 3.95 | 1.3M $LiPF_6$ |
| Comp. Ex. 9 | 4.00 | 1.3M $LiPF_6$ |
| Comp. Ex. 10 | 4.05 | 1.3M $LiPF_6$ |
| Comp. Ex. 11 | 4.10 | 1.3M $LiPF_6$ |
| Comp. Ex. 12 | 3.80 | 1.5M $LiPF_6$ |
| Comp. Ex. 13 | 3.80 | 1.4M $LiPF_6$ + 0.1M LiTFSI |
| Comp. Ex. 14 | 3.80 | 1.3M $LiPF_6$ + 0.2M LiTFSI |
| Comp. Ex. 15 | 3.80 | 1.2M $LiPF_6$ + 0.3M LiTFSI |
| Comp. Ex. 16 | 3.80 | 1.1M $LiPF_6$ + 0.4M LiTFSI |
| Comp. Ex. 17 | 3.80 | 1.0M $LiPF_6$ + 0.5M LiTFSI |
| Comp. Ex. 18 | 3.80 | 0.8M $LiPF_6$ + 0.7M LiTFSI |
| Comp. Ex. 19 | 3.90 | 1.0M $LiPF_6$ + 0.5M LiTFSI |
| Comp. Ex. 20 | 4.00 | 1.0M $LiPF_6$ + 0.5M LiTFSI |
| Comp. Ex. 21 | 4.10 | 1.0M $LiPF_6$ + 0.5M LiTFSI |
| Comp. Ex. 22 | 3.80 | 1.0M $LiPF_6$ + 0.5M LiBETI |
| Comp. Ex. 23 | 3.80 | 1.0M $LiPF_6$ + $LiBF_4$ 0.05 wt % |
| Example 1 | 3.80 | 1.0M $LiPF_6$ + 0.5M LiTFSI + $LiBF_4$ 0.05 wt % |
| Example 2 | 3.80 | 1.0M $LiPF_6$ + 0.5M LiTFSI + $LiBF_4$ 0.1 wt % |
| Example 3 | 3.80 | 1.0M $LiPF_6$ + 0.5M LiTFSI + $LiBF_4$ 0.15 wt % |
| Example 4 | 3.80 | 1.0M $LiPF_6$ + 0.5M LiTFSI + $LiBF_4$ 0.2 wt % |
| Example 5 | 3.80 | 1.0M $LiPF_6$ + 0.5M LiTFSI + $LiBF_4$ 0.3 wt % |
| Example 6 | 3.80 | 1.0M $LiPF_6$ + 0.5M LiTFSI + $LiBF_4$ 0.4 wt % |
| Example 7 | 3.80 | 1.0M $LiPF_6$ + 0.5M LiTFSI + $LiBF_4$ 0.5 wt % |
| Example 8 | 3.90 | 1.0M $LiPF_6$ + 0.5M LiTFSI + $LiBF_4$ 0.2 wt % |
| Example 9 | 4.00 | 1.0M $LiPF_6$ + 0.5M LiTFSI + $LiBF_4$ 0.2 wt % |
| Example 10 | 4.10 | 1.0M $LiPF_6$ + 0.5M LiTFSI + $LiBF_4$ 0.2 wt % |
| Example 11 | 4.10 | 1.0M $LiPF_6$ + 0.5M LiTFSI + $LiBF_4$ 0.6 wt % |
| Example 12 | 4.10 | 0.7M $LiPF_6$ + 0.8M LiTFSI + $LiBF_4$ 0.05 wt % |
| Example 13 | 3.80 | 1.6M $LiPF_6$ + 0.5M LiTFSI + $LiBF_4$ 0.05 wt % |
| Example 14 | 3.80 | 1.5M $LiPF_6$ + 0.5M LiTFSI + $LiBF_4$ 0.04 wt % |
| Example 15 | 3.80 | 1.0M $LiPF_6$ + 0.5M LiTFSI + $LiBF_4$ 1.0 wt % |

Example 16

1 g of $(NH_4)_2HPO_4$ and 1.5 g of Al nitrate ($Al(NO_3)_3 \cdot 9H_2O$) were added to 100 Ml of water to prepare a coating liquid. Herein, an amorphous $AlPO_k$ phase was extracted with a colloid form. 20 g of $LiCoO_2$ having an average particle diameter of 10 μm was added to 10 Ml of the coating liquid, mixed, and dried for 30 minutes at 130° C. The dried powder was heat treated at 400° C. for 5 hours to prepare a positive active material having a surface treatment layer that included a solid solution compound including Al and P, and an $AlPO_k$ compound. The total amount of the Al and P was 1 wt % of the positive active material.

A rechargeable lithium battery cell was fabricated according to the same method as in Example 1, except that the prepared positive active material was used.

Example 17

A rechargeable lithium battery cell was fabricated according to the same method as in Example 16, except that $LiMn_2O_4$ with an average particle diameter of 13 μm was used instead of $LiCoO_2$.

Example 18

A rechargeable lithium battery cell was fabricated according to the same method as in Example 16, except that $LiNi_{0.9}Co_{0.1}Sr_{0.002}O_2$ with an average particle diameter of 13 μm was used instead of $LiCoO_2$.

Example 19

A rechargeable lithium battery was fabricated according to the same method as in Example 16, except that 20 g of a $SnO_2$ active material with an average particle diameter of 10 μm was added to 20Ml of a coating liquid. The total amount of the Al and P was 2 wt % of the active material.

The rechargeable lithium battery cells fabricated according to the Examples 1 to 15 and Comparative Examples 1 to 23 were estimated with respect to cycle-life characteristics at both room temperature and a high temperature.

The rechargeable lithium battery cells according to Examples 1 to 15 and Comparative Examples 1 to 23 were charged at 0.2 C, and then discharged at 0.2 C for a formation charge and discharge, and then charging at 0.5 C and discharging at 0.2 C were performed for a standard charge and discharge.

The rechargeable lithium battery cells were charged at 1.0 C and discharged at 1.0 C, and capacities at the 300th cycles at 25° C. and 45° C. were measured to evaluate cycle-life characteristics. The measurement results are shown in the following Table 2.

TABLE 2

| | 300th cycle-life at 25° C. | 300th cycle-life at 45° C. |
|---|---|---|
| Comp. Ex. 1 | 80 | 0 |
| Comp. Ex. 2 | 79 | 0 |
| Comp. Ex. 3 | 77 | 0 |
| Comp. Ex. 4 | 72 | 0 |
| Comp. Ex. 5 | 70 | 0 |
| Comp. Ex. 6 | 68 | 0 |
| Comp. Ex. 7 | 32 | 0 |
| Comp. Ex. 8 | 60 | 0 |
| Comp. Ex. 9 | 55 | 0 |
| Comp. Ex. 10 | 47 | 0 |
| Comp. Ex. 11 | 43 | 0 |
| Comp. Ex. 12 | 71 | 0 |
| Comp. Ex. 13 | 72 | 40 |
| Comp. Ex. 14 | 72 | 49 |
| Comp. Ex. 15 | 73 | 55 |
| Comp. Ex. 16 | 73 | 64 |
| Comp. Ex. 17 | 74 | 68 |
| Comp. Ex. 18 | 70 | 66 |
| Comp. Ex. 19 | 63 | 60 |
| Comp. Ex. 20 | 62 | 60 |
| Comp. Ex. 21 | 60 | 58 |

TABLE 2-continued

|  | 300th cycle-life at 25° C. | 300th cycle-life at 45° C. |
| --- | --- | --- |
| Comp. Ex. 22 | 73 | 67 |
| Comp. Ex. 23 | 72 | 65 |
| Example 1 | 72 | 70 |
| Example 2 | 78 | 75 |
| Example 3 | 83 | 80 |
| Example 4 | 85 | 81 |
| Example 5 | 82 | 79 |
| Example 6 | 81 | 76 |
| Example 7 | 80 | 74 |
| Example 8 | 68 | 72 |
| Example 9 | 62 | 71 |
| Example 10 | 50 | 71 |
| Example 11 | 72 | 68 |
| Example 12 | 61 | 59 |
| Example 13 | 70 | 64 |
| Example 14 | 68 | 60 |
| Example 15 | 65 | 0 |

As shown in the Table 1, as the positive active mass density increases, the cycle-life characteristic is decreased at room temperature. However, the lithium rechargeable battery cells including the $LiPF_6$, $LiBF_4$, and the lithium imide-based compound as a lithium salt according to Examples 1 to 10 showed excellent cycle-life characteristics at room temperature and a high temperature, even though they used a positive electrode with a high active mass density. Further, the battery cells according to Examples 11 to 15 where the content of $LiPF_6$, $LiBF_4$, and the lithium imide-based compound were out of the range of the present invention showed reduced cycle-life characteristics at room temperature and/or a high temperature.

The rechargeable lithium battery cells according to Examples 16 to 19 were estimated with respect to cycle-life characteristics at room temperature and a high temperature with the same method as above. Results showed that they had the same cycle-life characteristics as in Example 3.

The rechargeable lithium battery has high capacity, and excellent cycle-life characteristics, particularly at a high temperature.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable lithium battery comprising:
a positive electrode including a positive active material being capable of intercalating and deintercalating lithium ions, the positive electrode having an active mass density of 3.65 g/cc or more;
a negative electrode including a negative active material being capable of intercalating and deintercalating lithium ions; and
an electrolyte including a non-aqueous organic solvent and a lithium salt, the lithium salt comprising lithium hexafluorophosphate ($LiPF_6$), lithium tetrafluoroborate ($LiBF_4$), and a lithium imide-based compound, wherein the $LiBF_4$ is present in an amount of 0.05 to 0.5 wt % based on the total weight of the electrolyte, and the lithium imide-based compound is present at a 0.1 to 0.7M concentration in the electrolyte.

2. The rechargeable lithium battery of claim 1, wherein the lithium imide-based compound is selected from the group consisting of $Li[N(SO_2CF_3)_2]$, $Li[N(SO_2CF_2CF_3)_2]$, and a combination thereof.

3. The rechargeable lithium battery of claim 1, wherein the $LiPF_6$ is present at a 0.7 to 1.5M concentration in the electrolyte.

4. The rechargeable lithium battery of claim 1, wherein the electrolyte further includes at least one lithium salt selected from the group consisting of $LiSbF_6$, $LiAsF_6$, $LiClO_4$, $LiCF_3SO_3$, $LiC_4F_9SO_3$, $LiAlO_4$, $LiAlCl_4$, $LiSO_3CF_3$, $LiCl$, $LiI$, $LiB(C_2O_4)_2$, and combinations thereof.

5. The rechargeable lithium battery of claim 1, wherein the positive electrode has an active mass density of 3.7 to 4.1 g/cc or more.

6. The rechargeable lithium battery of claim 1, wherein the positive active material includes a lithiated intercalation compound.

7. The rechargeable lithium battery of claim 6, wherein the lithiated intercalation compound is a composite oxide including lithium and a metal selected from the group consisting of cobalt, manganese, nickel and combinations thereof.

8. The rechargeable lithium battery of claim 1, wherein the positive active material is selected from the group consisting of the following Formulas 1 to 24:

$$Li_a A_{1-b} T_b D_2 \quad (1)$$

wherein, in the above Formula 1, $0.95 \leq a \leq 1.1$ and $0 \leq b \leq 0.5$;

$$Li_a E_{1-b} T_b O_{2-c} L_c \quad (2)$$

wherein, in the above Formula 2, $0.95 \leq a \leq 1.1$, $0 \leq b \leq 0.5$, and $0 \leq c \leq 0.05$;

$$LiE_{2-b} T_b O_{4-c} L_c \quad (3)$$

wherein, in the above Formula 3, $0 \leq b \leq 0.5$ and $0 \leq c \leq 0.05$;

$$Li_a Ni_{1-b-c} Co_b T_c D_\alpha \quad (4)$$

wherein, in the above Formula 4, $0.95 \leq a \leq 1.1$, $0 \leq b \leq 0.5$, and $0 \leq c \leq 0.05$, $0 < \alpha \leq 2$;

$$Li_a Ni_{1-b-c} Co_b T_c O_{2-\alpha} L_\alpha \quad (5)$$

wherein, in the above Formula 5, $0.95 \leq a \leq 1.1$, $0 \leq b \leq 0.5$, and $0 \leq c \leq 0.05$, $0 < \alpha \leq 2$;

$$Li_a Ni_{1-b-c} Co_b T_c O_{2-\alpha} L_2 \quad (6)$$

wherein, in the above Formula 6, $0.95 \leq a \leq 1.1$, $0 \leq b \leq 0.5$, and $0 \leq c \leq 0.05$, $0 < \alpha < 2$;

$$Li_a Ni_{1-b-c} Mn_b T_c D_\alpha \quad (7)$$

wherein, in the above Formula 7, $0.95 \leq a \leq 1.1$, $0 \leq b \leq 0.5$, $0 \leq c \leq 0.05$, and $0 < \alpha \leq 2$;

$$Li_a Ni_{1-b-c} Mn_b T_c O_{2-\alpha} L_\alpha \quad (8)$$

wherein, in the above Formula 8, $0.95 \leq a \leq 1.1$, $0 \leq b \leq 0.5$, $0 \leq c \leq 0.05$, and $0 < \alpha < 2$;

$$Li_a Ni_{1-b-c} Mn_b T_c O_{2-\alpha} L_{hd\ 2} \quad (9)$$

wherein, in the above Formula 9, $0.95 \leq a \leq 1.1$, $0 \leq b \leq 0.5$, $0 \leq c \leq 0.05$, and $0 < \alpha < 2$;

$$Li_a Ni_b E_c G_d O_2 \quad (10)$$

wherein, in the above Formula 10, $0.90 \leq a \leq 1.1$, $0 \leq b \leq 0.9$, $0 \leq c \leq 0.9$, and $0.001 \leq d \leq 0.2$;

$$Li_a Ni_b Co_c Mn_d G_e O_2 \quad (11)$$

wherein, in the above Formula 11, $0.90 \leq a \leq 1.1$, $0 \leq b \leq 0.9$, $0 \leq c \leq 0.5$, $0 \leq d \leq 0.5$, and $0.001 \leq e \leq 0.2$;

$$Li_a NiG_b O_2 \quad (12)$$

wherein, in the above Formula 12, $0.90 \leq a \leq 1.1$ and $0.001 \leq b \leq 0.1$;

$$Li_aCoG_bO_2 \quad (13)$$

wherein, in the above Formula 13, $0.90 \leq a \leq 1.1$ and $0.001 \leq b \leq 0.1$;

$$Li_aMnG_bO_2 \quad (14)$$

wherein, in the above Formula 14, $0.90 \leq a \leq 1.1$ and $0.001 \leq b \leq 0.1$;

$$Li_aMn_2G_bO_4 \quad (15)$$

wherein, in the above Formula 15, $0.90 \leq a \leq 1.1$ and $0.001 \leq b \leq 0.2$;

$$QO_2, \quad (16);$$

$$QS_2, \quad (17);$$

$$LiQS_2, \quad (18);$$

$$V_2O_5, \quad (19);$$

$$LiV_2O_5, \quad (20);$$

$$LiZO_2, \quad (21);$$

$$LiNiVO_4, \quad (22);$$

$$Li_{3-f}J_2(PO_4)_3 \ (0 \leq f \leq 3), \text{ and} \quad (23);$$

$$Li_{3-f}Fe_2(PO_4)_3 (0 \leq f \leq 2), \quad (24)$$

wherein, in the above Formulas 1 to 24, A is selected from the group consisting of Ni, Co, Mn, and combinations thereof; T is selected from the group consisting of Al, Ni, Co, Mn, Cr, Fe, Mg, Sr, V, a rare earth element, and combinations thereof; D is selected from the group consisting of O, F, S, P, and combinations thereof; E is selected from the group consisting of Co, Mn, and combinations thereof; L is selected from the group consisting of F, S, P, and combinations thereof; G is selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Ti, Si, Ge, Sn, P, As, Sb, Bi, S, Se, Te, Po, Fe, Sr, lanthanide, and combinations thereof; Q is selected from the group consisting of Ti, Mo, Mn, and combinations thereof; Z is selected from the group consisting of Cr, V, Fe, Sc, Y, Ti, and combinations thereof; and J is selected from the group consisting of V, Cr, Mn, Co, Ni, Cu, and combinations thereof.

9. The rechargeable lithium battery of claim 1, wherein the positive active material is an elemental sulfur or a sulfur-based compound selected from the group consisting of $Li_2S_n$, where $n \geq 1$, $Li_2S_n$, where $n \geq 1$, dissolved in a catholyte, an organic sulfur compound, and $(C_2S_f)_n$ where f=2.5 to 50, and $n \geq 2$.

10. The rechargeable lithium battery of claim 1, wherein the positive active material is a material surface-treated with the compound of Formula 25:

$$MXO_k \quad (25)$$

wherein M is at least one selected from the group consisting of an alkali metal, an alkaline-earth metal, a Group 13 element, a Group 14 element, a transition element, and a rare earth element, X is an element being capable of forming a double bond with oxygen, and k ranges from 2 to 4.

11. The rechargeable lithium battery of claim 10, wherein the element M is selected from the group consisting of Na, K, Mg, Ca, Sr, Ni, Co, Si, Ti, B, Al, Sn, Mn, Cr, Fe, V, Zr, and combinations thereof.

12. The rechargeable lithium battery of claim 10, wherein the element being capable of forming a double bond with oxygen is selected from the group consisting of P, S, W, and combinations thereof.

13. The rechargeable lithium battery of claim 1, wherein the positive active material includes a lithiated intercalation compound, a compound of Formula 25 over the surface of the lithiated intercalation compound, and a solid-solution compound formed between the lithiated intercalation compound and the compound of Formula 25, the solid-solution compound including Li, M', M, and X:

$$MXO_k \quad (25)$$

wherein M is at least one selected from the group consisting of an alkali metal, an alkaline-earth metal, a Group 13 element, a Group 14 element, a transition element, and a rare earth element, X is an element being capable of forming a double bond with oxygen, and k ranges from 2 to 4; and M' is at least one selected from the group consisting of Al, Ni, Co, Mn, Cr, Fe, Mg, Sr, V, a rare-earth element and a combination thereof.

14. The rechargeable lithium battery of claim 13, wherein the elements M and X have a concentration gradient from the surface of the positive active material toward the center of the active material.

15. The rechargeable lithium battery of claim 1, wherein the negative active material comprises at least one selected from the group consisting of lithium, a metal being capable of alloying with lithium, a carbonaceous material, a composite material including the metal and carbonaceous material, and combinations thereof.

16. The rechargeable lithium battery of claim 1, wherein the non-aqueous organic solvent is at least one selected from the group consisting of a carbonate-based solvent, an ester-based solvent, an ether-based solvent, a ketone-based solvent, an alcohol-based solvent, an aprotic solvent, and combinations thereof.

17. The rechargeable lithium battery of claim 1, wherein the non-aqueous organic solvent comprises mixtures of a carbonate-based solvent and an aromatic hydrocarbon solvent represented by Formula 26:

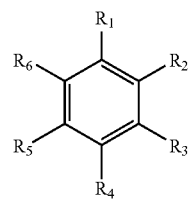

(26)

where $R_1$ to $R_6$ are independently selected from the group consisting of hydrogen, a halogen, a C1 to C10 alkyl, a haloalkyl, and combinations thereof.

18. The rechargeable lithium battery of claim 1, wherein the electrolyte further includes an additive including an ethylene carbonate-based compound represented by the following Formula 27:

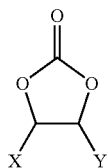

(27)

wherein X and Y are independently selected from the group consisting of hydrogen, a halogen, cyano (CN), nitro ($NO_2$), and a fluorinated C1 to C5 alkyl, provided that at least one of X and Y is selected from the group consisting of a halogen, a cyano (CN), a nitro ($NO_2$), and a fluorinated C1 to C5 alkyl.

19. A rechargeable lithium battery comprising:
a positive electrode including a positive active material being capable of intercalating and deintercalating lithium ions;
a negative electrode including a negative active material being capable of intercalating and deintercalating lithium ions; and
an electrolyte including a non-aqueous organic solvent and a lithium salt, the lithium salt comprising lithium hexafluorophosphate ($LiPF_6$), lithium tetrafluoroborate ($LiBF_4$), and a lithium imide-based compound, wherein the $LiBF_4$ is present in an amount of 0.05 to 0.5 wt % based on the total weight of the electrolyte.

20. A rechargeable lithium battery comprising:
a positive electrode including a positive active material being capable of intercalating and deintercalating lithium ions, the positive electrode including a lithiated intercalation compound, a surface-treatment layer on the lithiated intercalation compound, the surface-treatment layer comprising a compound of Formula 25 and a solid-solution compound between the lithiated intercalation compound and the compound of Formula 25, the solid-solution compound including Li, M', M, and X:

$$MXO_k \quad (25)$$

wherein M is at least one selected from the group consisting of an alkali metal, an alkaline-earth metal, a Group 13 element, a Group 14 element, a transition element, and a rare earth element, X is an element being capable of forming a double bond with oxygen, and k ranges from 2 to 4; and
M' is at least one selected from the group consisting of Al, Ni, Co, Mn, Cr, Fe, Mg, Sr, V, a rare-earth element and a combination thereof;
a negative electrode including a negative active material being capable of intercalating and deintercalating lithium ions; and
an electrolyte including a non-aqueous organic solvent and a lithium salt, the lithium salt comprising lithium hexafluorophosphate ($LiPF_6$), lithium tetrafluoroborate ($LiBF_4$), and a lithium imide-based compound, the concentration of the $LiPF_6$ in the electrolyte ranging from 0.7 to 1.5M, the concentration of the $LiBF_4$ in the electrolyte ranging from 0.05 to 0.5 wt % based on the total weight of the electrolyte, the concentration of the lithium imide-based compound in the electrolyte ranging from 0.1 to 0.7M.

* * * * *